US009421960B2

(12) United States Patent
Grasso et al.

(10) Patent No.: US 9,421,960 B2
(45) Date of Patent: Aug. 23, 2016

(54) BRAKING INSTALLATION FOR A RAILWAY TRAIN INCLUDING A PLURALITY OF WAGONS FOR TRANSPORTING GOODS

(71) Applicant: FAIVELEY TRANSPORT ITALIA S. p. A., Piossasco (Turin) (IT)

(72) Inventors: Angelo Grasso, Canelli (IT); Francesco Demaria, Rivalta di Torino (IT); David Wynd, Emu Plains (AU)

(73) Assignee: FAIVELEY TRANSPORT ITALIA S. p. A., Turin (IT)

( * ) Notice: Subject to any disclaimer, the term of this patent is extended or adjusted under 35 U.S.C. 154(b) by 17 days.

(21) Appl. No.: 14/385,369

(22) PCT Filed: Mar. 15, 2013

(86) PCT No.: PCT/IB2013/052076
§ 371 (c)(1),
(2) Date: Sep. 15, 2014

(87) PCT Pub. No.: WO2013/136306
PCT Pub. Date: Sep. 19, 2013

(65) Prior Publication Data
US 2015/0061359 A1 Mar. 5, 2015

(30) Foreign Application Priority Data

Mar. 16, 2012 (IT) .............................. TO2012A0229

(51) Int. Cl.
*B60T 15/02* (2006.01)
*B60T 13/66* (2006.01)
(Continued)

(52) U.S. Cl.
CPC ............ *B60T 15/021* (2013.01); *B60T 13/665* (2013.01); *B60T 15/027* (2013.01); *B60T 17/228* (2013.01); *B61H 13/20* (2013.01)

(58) Field of Classification Search
CPC .. B60T 13/665; B60T 17/228; B60T 15/021; B60T 15/027; B61H 13/20
USPC ................................. 303/8, 7, 15, 66, 81, 82
See application file for complete search history.

(56) References Cited

U.S. PATENT DOCUMENTS 4,582,280 A * 4/1986 Nichols ................... B60L 15/32
105/61
5,924,774 A * 7/1999 Cook .................... B60T 13/665
303/115.2
(Continued)

FOREIGN PATENT DOCUMENTS

| EP | 2 349 799 | 8/2011 |
|----|-----------|--------|
| WO | 2006/124083 A2 | 11/2006 |
| WO | 2010/046880 A1 | 4/2010 |

OTHER PUBLICATIONS

International Search Report for PCT/IB2013/052076 dated Oct. 21, 2013.
(Continued)

*Primary Examiner* — Thomas J Williams
*Assistant Examiner* — Mariano Sy
(74) *Attorney, Agent, or Firm* — Sughrue Mion, PLLC

(57) ABSTRACT

A braking installation (1) includes a pneumatic brake pipe (BP) which extends along the train, and wherein the pressure is controlled by a braking control apparatus (BCA) in the locomotive (L), an electrical power supply and communication line (EL) which extends along the train, and which is coupled to an electronic control unit (ECU) in the locomotive (L); and in each wagon (W) or in each group of wagons (W), an electronic module (EM) coupled to the electrical line (EL) through power supply and communication interface devices (I, I1), and further connected to an electro-pneumatic control assembly (EPC) designed for driving pneumatic brake valve means (ELV).

9 Claims, 3 Drawing Sheets

(51) Int. Cl.
*B60T 17/22* (2006.01)
*B61H 13/20* (2006.01)

(56) References Cited

U.S. PATENT DOCUMENTS

| | | | | |
|---|---|---|---|---|
| 6,036,284 A * | 3/2000 | Pettit | ................... | B60T 13/665 303/15 |
| 6,648,422 B2 * | 11/2003 | Root | ................... | B60T 13/662 303/15 |
| 6,839,664 B1 * | 1/2005 | Kull | ................... | B60T 13/665 303/15 |
| 6,997,520 B1 * | 2/2006 | Barberis | ............. | B61L 15/0036 188/34 |
| 7,029,076 B2 * | 4/2006 | Root | ................... | B60T 13/662 303/15 |
| 7,631,949 B2 * | 12/2009 | Truglio | ................. | B60T 13/665 303/30 |
| 8,439,454 B2 * | 5/2013 | Tione | ................... | B60T 13/665 118/112 R |
| 2001/0037167 A1 * | 11/2001 | Barberis | ............... | B60T 13/665 701/19 |
| 2005/0029859 A1 * | 2/2005 | Bensch | ..................... | B60T 7/10 303/89 |
| 2005/0099061 A1 * | 5/2005 | Hollandsworth | ..... | B60T 13/662 303/7 |
| 2011/0282525 A1 | 11/2011 | Kraeling et al. | | |

OTHER PUBLICATIONS

Written Opinion for PCT/IB2013/052076 dated Oct. 21, 2013.

* cited by examiner

BRAKING INSTALLATION FOR A RAILWAY TRAIN INCLUDING A PLURALITY OF WAGONS FOR TRANSPORTING GOODS

CROSS REFERENCE TO RELATED APPLICATIONS

This application is a National Stage of International Application No. PCT/IB2013/052076 filed Mar. 15, 2013, claiming priority based on Italian Patent Application No. TO2012A000229 filed Mar. 16, 2012, the contents of all of which are incorporated herein by reference in their entirety.

The present invention relates to braking installations for railway trains.

More specifically, the invention relates to a braking installation for a railway train having (at least) a locomotive and a plurality of wagons for transporting goods, comprising
  a pneumatic brake pipe which extends along the train, and wherein the pressure is controlled by a braking control apparatus in the locomotive,
  a power supply and communication line, which likewise extends along the train, and which is coupled to an electronic control unit in the locomotive; the installation further comprising, in each wagon or in each group of associated wagons:
  an electronic module coupled to said electrical line through interface means, and further connected to an electro-pneumatic control assembly designed for driving pneumatic brake valve means which are coupled to the brake pipe and are adapted to apply to brake cylinders of the wagon or of the group of wagons a braking pressure variable in a controlled manner;
  the electronic module being further connected to electrical sensor means associated with the electro-pneumatic assembly and/or the brake valve means for acquiring signals or data relating to values or states of predetermined quantities;
  the interface means comprising electronic processing and control means and transceiver means adapted to allow an exchange of information and/or data with said electronic control unit in the locomotive through said power supply and communication line, for controlling the braking of the wagon or group of wagons.

A braking installation for a railway train of this type is described, for example, in European patent application EP 2 349 799 A1 in the name of the present applicant.

In a braking installation of this type, the communication of information and/or data between the transceiver means of each wagon and the electronic control unit of the locomotive takes place along the power supply and communication line which extends along the train, typically in the 120-140 kHz frequency band, as specified, for example, in the AAR (Association of American Railroads) communications standard.

This communication facility is indeed sufficient for controlling the braking, but does not permit the exchange of ancillary, but highly useful, information, owing to the intrinsic limitation of the bandwidth available.

One object of the present invention is to provide an improved braking installation for railway trains of this type which can overcome the aforementioned problems of the prior art installations.

This and other objects are achieved according to the invention with a braking installation of the type specified above, characterized in that, in each wagon,
  a local communication network or bus is positioned between the interface means and the electronic module, and
  additional transceiver means are provided, which are coupled to said electrical power supply and communication line, and which operate in a frequency band which is different from and broader than that of said transceiver means;
  the aforesaid processing and control means being designed for driving the additional transceiver means when said transceiver means are active and/or inactive, and for communicating to the electronic control unit of the locomotive information derived from the signals provided by said electrical sensor means to the electronic module and transferred by the latter to the interface means through said local communication network or bus.

Other characteristics and advantages of the invention will become clear from the following detailed description, which is given purely by way of non-limiting example, with reference to the attached drawings, in which.

Figure 1:
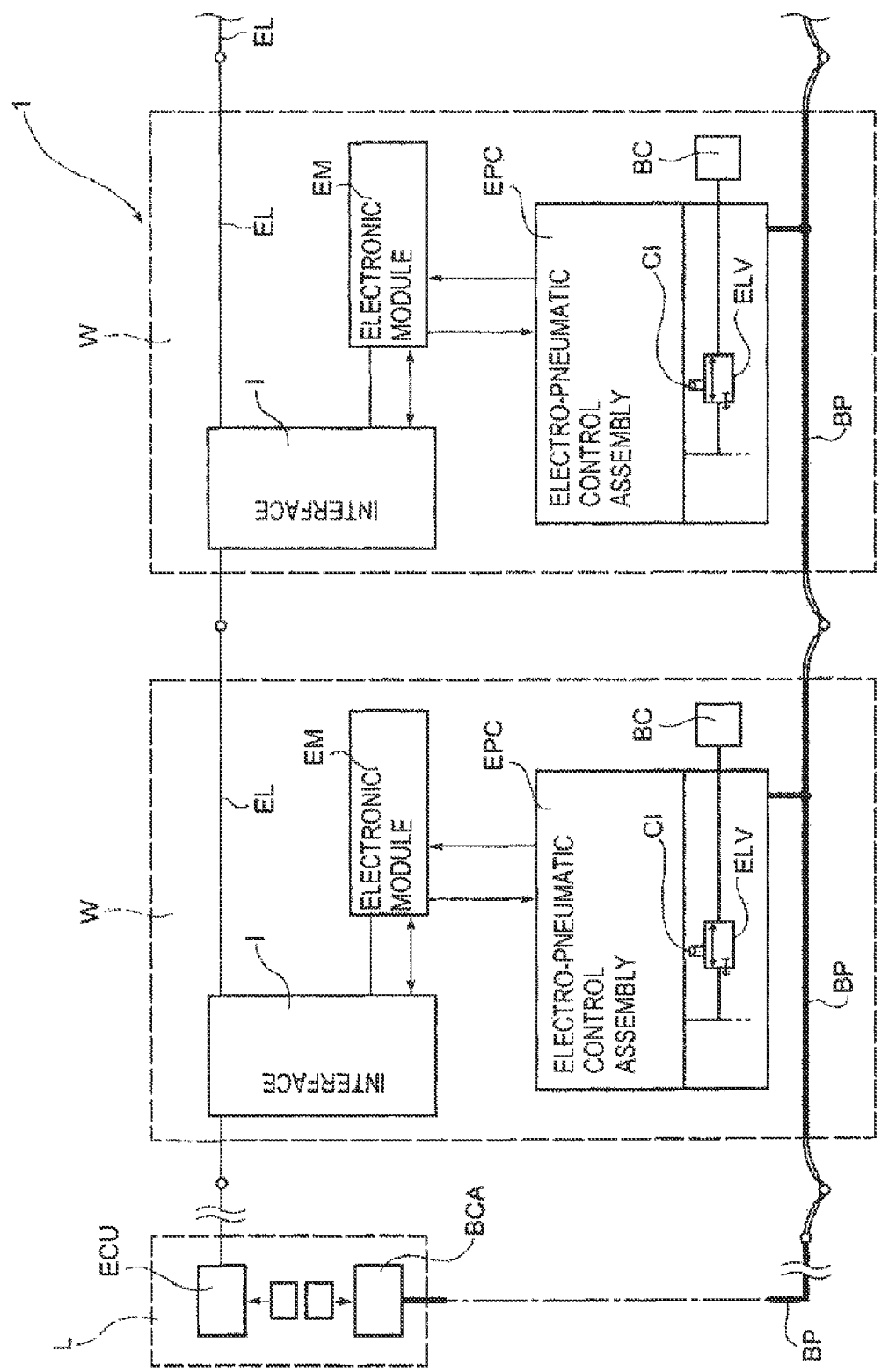
FIG. 1 is a schematic block diagram of a braking installation according to the invention for a railway train for transporting goods.

In FIG. 1, the number 1 indicates the whole of a braking installation according to the present invention, for a railway train including at least a locomotive L and a plurality of wagons W for transporting goods.

The wagons W of the train may be independent, that is to say each may be provided with the systems described below with particular reference to FIGS. 2 and 3, or may be divided into permanently associated groups, for example in pairs (each composed of a "master" and a "slave" wagon), in which case the systems described below with reference to FIGS. 2 and 3 may be variously distributed among the wagons of each group, or may all be installed on the "master" wagon of each group.

The braking installation 1 comprises a pneumatic brake pipe BP which extends from the locomotive L along the whole train.

In a known way, the pressure in the brake pipe BP is controlled by a braking control apparatus BCA in the locomotive.

There is normally a predetermined pneumatic pressure, of about 5 bar for example, in the brake pipe BP. In order to cause the pneumatic braking of the train, the pressure in the pipe BP is reduced by connecting this pipe to the outlet in a controlled manner.

An electrical power supply and communication line EL also extends along the train, and is coupled to an electronic control unit ECU located in the locomotive L.

In each wagon W or group of associated wagons, the electrical line EL is coupled to a respective electronic module EM through an interface system I.

The electronic module EM of each wagon W or group of wagons is, in turn, coupled to an associated electro-pneumatic control assembly EPC (FIG. 1), associated with a pneumatic brake valve ELV. The module EM is generally physically separated from the assembly EPC.

In a known way, the brake valve ELV of each wagon W or group of wagons W is coupled locally to the pipe BP, and is adapted to apply to the brake cylinders BC of the wagon W or group of wagons a braking pressure which is a function of a control pressure applied to a control input CI of the valve.

Embodiments of the electro-pneumatic control assembly EPC are illustrated and described in detail in the previous European patent application cited in the introduction to the present description.

Figure 2:
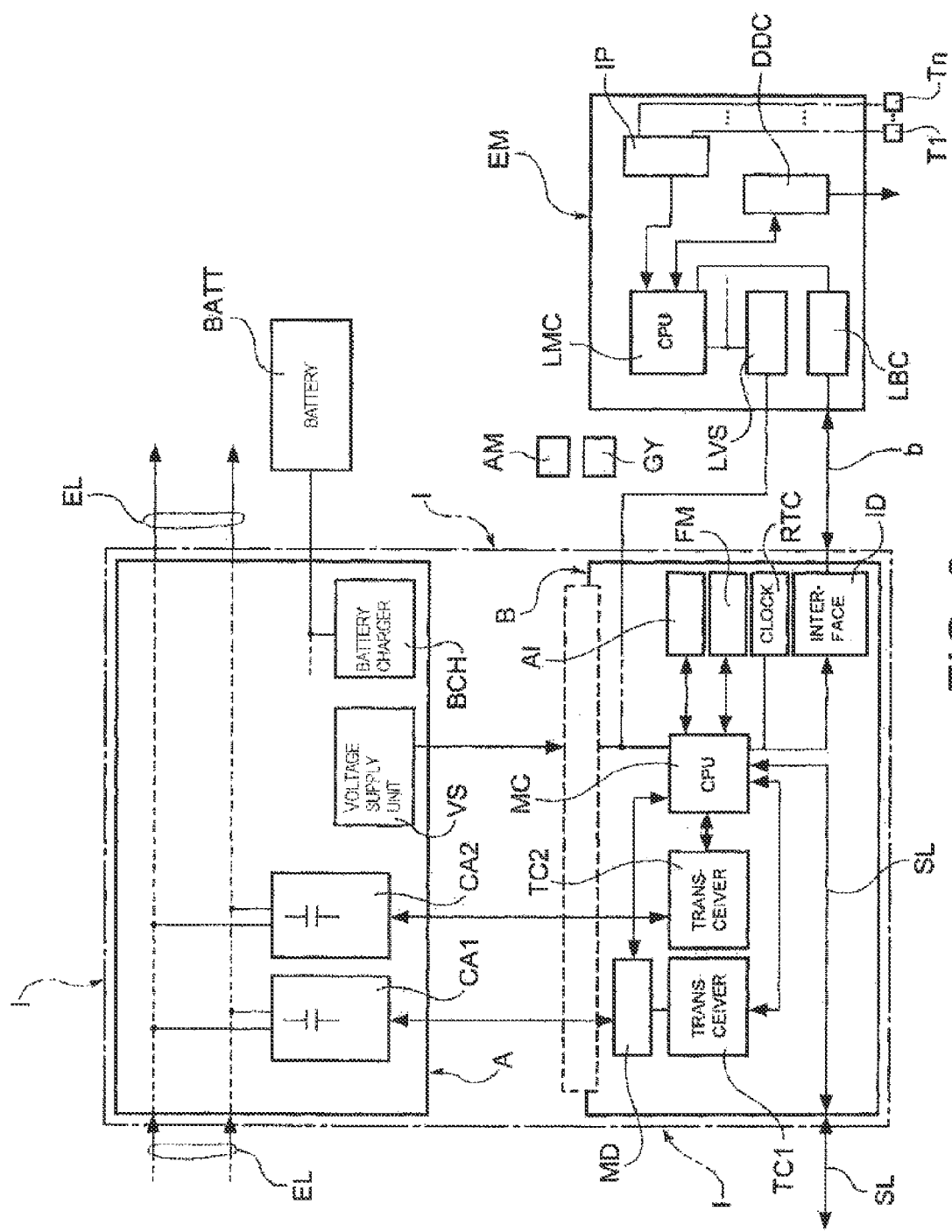
FIG. 2 is a more detailed block diagram of an embodiment of equipment installed on a wagon or group of associated wagons of the train.

With reference to FIG. 2, the interface system I, in the exemplary embodiment shown therein, essentially comprises two interconnected circuit boards A and B.

The board A is a power supply and communication interface board, and comprises a voltage supply unit VS connected (in a way which is not not shown) to the line EL, so as to supply from its output one or more d.c. voltages, for example a voltage of +5 V and a voltage of +12 V, to the board B.

The board A further comprises a battery charger BCH, coupled to a battery BATT associated with the interface system I.

The board A also comprises a pair of communication apparatuses CA1 and CA2, connected to the line EL and including decoupling devices, of the transformer type for example, and modulation/demodulation devices.

The board B of the interface system I comprises a microcontroller or CPU, indicated by MC.

The microcontroller MC is coupled to an interface device ID, operating for example according to the CAN (Controller Area Network) protocol and connected through a network, bus or line b to the electronic module EM.

The microcontroller MC is also connected to a transceiver TC1 of a known type, connected to the line EL through a monitoring device MD, which is also of a known type, such as a LON (Local Operational Network) monitor, and the communication apparatus CA1 of the board A.

The transceiver TC1 operates, for example, in the 120-140 kHz band, in accordance with the AAR communications standard specifications.

As a general rule, the transceiver TC2 can operate on a frequency band which may partially overlap the band on which the transceiver TC1 operates, the working band of TC2 being broader than that of TC1.

The microcontroller MC is further connected to another transceiver TC2. This additional transceiver TC2 is a high-speed transceiver, connected to the line EL through the communication apparatus CA2, and operating, for example, in the 40 to 120 kHz band.

In the board B, a clock signal generator RTC, memory devices FM and an analogue interface AI are also connected to the microcontroller MC.

The microcontroller MC can be accessed through a serial line SL, for the purpose of maintenance operations, for example.

The electronic module EM comprises a local voltage supply unit LVS, which receives d.c. voltages and an earth potential from the board B of the interface system I, and which provides the necessary supply voltages for all the devices of the module EM.

The electronic module EM also comprises a local microcontroller LMC, which is connected to a controller bus LBC coupled to the local serial network b, and driving and diagnostic circuit devices indicated as a whole by DDC, designed to control in a known way the braking and brake release solenoid valves and the relay valve ELV of the wagon or group of wagons, and to acquire signals and/or data for the purpose of diagnosing malfunctions.

The local microcontroller LMC of the electronic module EM is further associated with analogue input gates IP, connected to analogue sensors/transducers T1, . . . , Tn for acquiring values or states of certain predetermined quantities such as the pneumatic pressure in the brake cylinder BC, reservoir pressures, and the like.

The local microcontroller LMC of the module EM is designed to provide not only the usual functions of controlling the braking of the wagon or group of wagons, but also functions of acquiring signals for diagnostic purposes, which are transferred to the microcontroller MC of the board B of the interface system I.

The microcontroller MC of the interface system I is designed to communicate with the system ECU of the locomotive L through the transceiver TC1 in a known way, according to the AAR standard specifications for example.

Conveniently, the microcontroller MC is also designed to manage further communication with the unit ECU of the locomotive L, through the additional transceiver TC2 and the same power supply and communication line EL, in particular in order to communicate to said unit ECU the diagnostic information and any other information derived from the signals or data supplied by the sensors or transducers T1, . . . , Tn associated with the wagon or group of wagons.

The information which may conveniently be conveyed to the unit ECU of the locomotive through the additional transceiver TC2 includes information indicating the risk of derailment of the wagon or group of wagons, anti-theft alarm information, and other information.

If the transceiver TC2 operates on a frequency band which does not overlap that of the transceiver TC1, the communication between the additional transceiver TC2 and the unit ECU can also take place simultaneously with the communication between the transceiver TC1 and said unit. Clearly, in this case the unit ECU is designed to separate the signals which it receives through the line EL according to whether the signals are provided by the transceiver TC1 or by the transceiver TC2.

Alternatively, particularly if the transceiver TC2 operates in a band which at least partially coincides with that on which the transceiver TC1 operates, the microcontroller MC of the interface system 1 may be designed to activate the communication between the additional transceiver TC2 and the unit ECU of the locomotive only when the transceiver TC1 is inactive, for example when the train is stationary.

In this case, the information obtained from the electronic module EM and intended to be conveyed to the unit ECU of the locomotive through the additional transceiver TC2 can be stored during operation in memory devices associated with the microcontroller MC of the interface system I, and can be "pumped" to the system ECU of the locomotive through the additional transceiver TC2 in periods in which the transceiver TC1 is inoperative.

The system described above can if necessary be supplemented, for example by using a triaxial accelerometer device AM (FIG. 2), which can be physically incorporated into the board B of the interface system I, or into the electronic module EM, to monitor the running stability of the wagon W or group of wagons, and to supply an early warning of possible derailment conditions.

The same accelerometer AM can also be used to compute the actual running speed of the wagon W or group of wagons.

The system can also be equipped with a gyroscope GY (FIG. 2), which can also be incorporated into the board B of the interface system I, or into the electronic module EM, to supply signals indicating the speed components of the wagon W or group of wagons relative to three orthogonal axes, to allow the detection of conditions of possible "lurching".

Finally, the microcontroller MC or the microcontroller LMC can be designed to provide an anti-skid function by monitoring the wheel speed and running speed of the wagon or group of wagons and processing these data.

Figure 3:
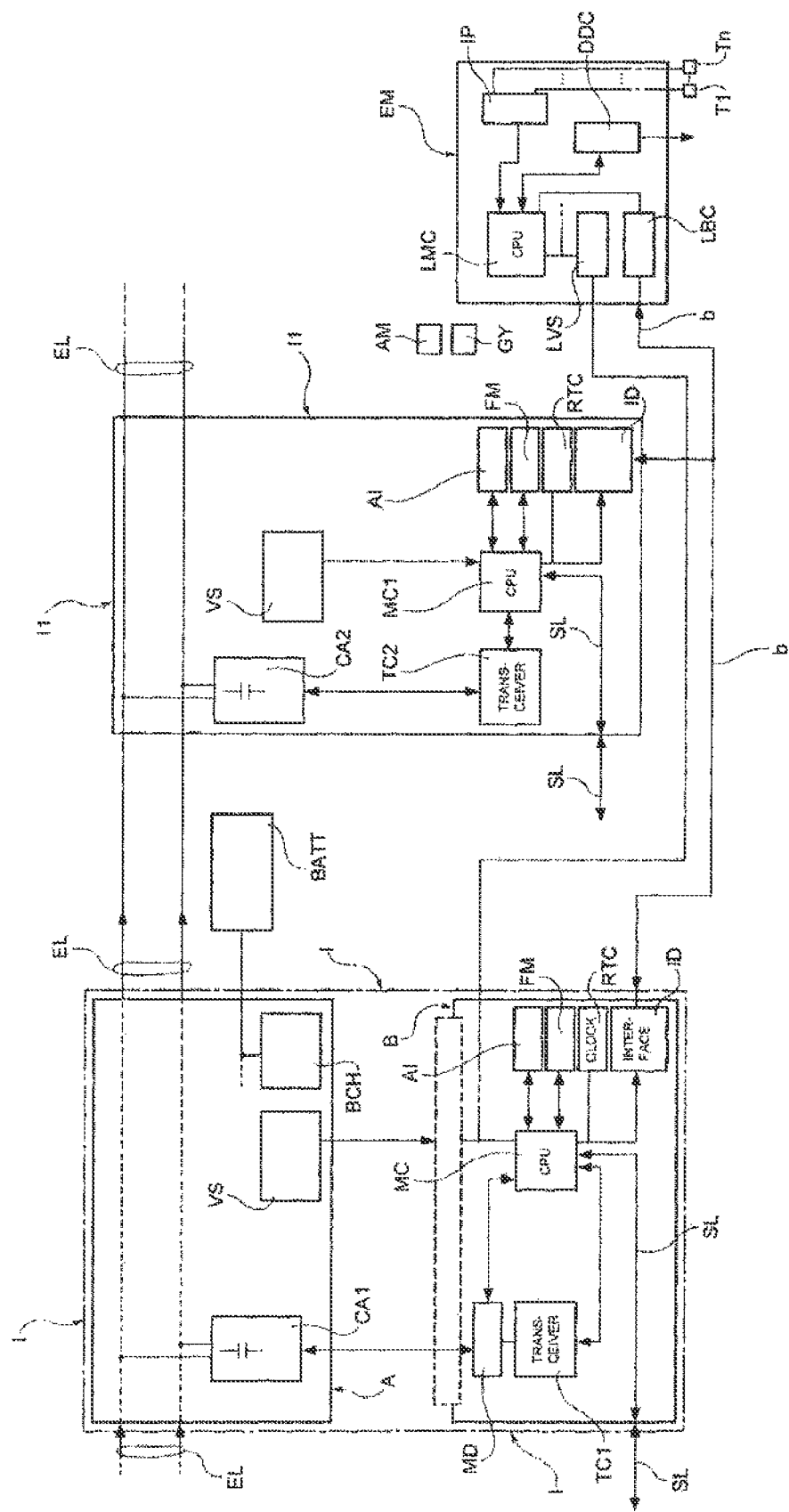
FIG. 3 is a block diagram of a variant embodiment of the equipment installed on a wagon or a group of associated wagons of the train.

FIG. 3 shows a variant embodiment of the systems with which each wagon W or each group of associated wagons W is equipped.

In this drawing, devices described previously have been given the same alphanumeric references as those used previously.

In the variant according to FIG. 3, the interface system I (board B) of each wagon or group of wagons comprises a single transceiver, particularly the transceiver TC1 described above. Accordingly, the interface system I (board A) comprises a single communication apparatus (CA1) connected to the line EL.

In other respects, the interface system I of FIG. 3 is substantially similar to that described with reference to FIG. 2.

In the variant according to FIG. 3, the electronic module EM also has the same architecture and the same functional characteristics as the module of the same type described previously in relation to FIG. 2.

The variant according to FIG. 3 includes an additional interface system, indicated as a whole by I1, which is also coupled to the line EL and to the network or bus b.

This additional interface system I1 can be installed on the same wagon W as that on which the system I is installed, or, in the case of a group of associated wagons, is installed on a wagon of the group which is not necessarily the same wagon as that on which the interface system I is installed.

The system I1 comprises a communication apparatus CA2 and a second transceiver TC2, corresponding to the apparatus of the same type shown in FIG. 2.

The transceiver TC2 is controlled by an additional microcontroller MC1, similar to that of the board B of the interface system I. The additional microcontroller MC1 is coupled to a clock signal generator RTC, memory devices FM, an analogue interface AI and a serial line SL, which are similar to the devices of the same type in the interface system I.

The microcontroller MC1 is also coupled to an interface device ID, operating for example according to the CAN protocol and connected to the electronic module EM through the network or bus b.

Finally, the interface system I1 can be provided with its own voltage supply unit VS, or can be supplied (in a way which is not shown) by the same type of power supply as that of the interface system I.

Once again, in the variant according to FIG. 3, the system can be supplemented with an accelerometer AM and/or with a gyroscope GY. These devices can be incorporated into the system I or into the system I1, or into the electronic module EM, in order to provide the monitoring functions described above.

The variant according to FIG. 3 has a different architecture, but its mode of operation is similar to that of the embodiment according to FIG. 2.

Clearly, provided that the principle of the invention is retained, the forms of application and the details of embodiment can be varied widely from what has been described and illustrated purely by way of non-limiting example, without thereby departing from the scope of protection of the invention as defined by the attached claims.

The invention claimed is:

1. Braking installation for a railway train including a locomotive and a plurality of wagons for transporting goods, comprising
    a pneumatic brake pipe which extends along the train, and wherein the pressure is controlled by a braking control apparatus in the locomotive,
    an electrical power supply and communication line which likewise extends along the train, and which is coupled to an electronic control unit in the locomotive; the installation further comprising, in each wagon or in each group of associated wagons:
    an electronic module coupled to said electrical power supply and communication line through power supply and communication interface means, and further connected to an electro-pneumatic control assembly designed for driving pneumatic brake valve means which are coupled to the pneumatic brake pipe and are adapted to apply to brake cylinders of the wagon or a group of wagons a braking pressure variable in a controlled manner;
    the electronic module being further connected to electrical sensor means associated with the electro-pneumatic control assembly and/or the brake valve means for acquiring signals or data relating to values or states of predetermined quantities;
    the interface means comprising electronic processing and control means and transceiver means adapted to allow an exchange of information and/or data with said electronic control unit of the locomotive through said power supply and communication line, for controlling the braking of the wagon or group of wagons; the installation being characterized in that, in each wagon or group of wagons,
    a local communication network or bus is positioned between the interface means and the electronic module, and
    additional transceiver means are provided, which are coupled to said electrical power supply and communication line, and which operate in a frequency band which is different from, possibly overlapping but broader than, that of said transceiver means;
    said processing and control means being designed for driving the additional transceiver means when said transceiver means are active and/or inactive, and for communicating to the electronic control unit of the locomotive information derived from the signals provided by said electrical sensor means to the electronic module and transferred by the electronic module to the interface means through said local communication network or bus.

2. Braking installation according to claim 1, wherein said transceiver means and the additional transceiver means are included in a same interface means and are driven by the processing and control means, also included in said same interface means.

3. Braking installation according to claim 2, wherein there are a plurality of said interface means and a plurality of said processing and control means and said transceiver means and the additional transceiver means are respectively included in said plurality of interface means distinct from one another, both coupled to said electrical supply and communication line and said local communication network or bus, and respectively provided with said plurality of processing and control means.

4. Braking installation according to claim 3, wherein said interface means in each group of associated wagons are installed on the same wagon, or on different wagons.

5. Braking installation according to claim 1, wherein said local communication network or bus comprises a serial line.

6. Braking installation according to claim 1, further comprising accelerometer means adapted for supplying signals indicating the running stability conditions of the wagon.

7. Braking installation according to claim 6, wherein said processing and control means are adapted for processing the signals supplied by the accelerometer means for computing an actual running speed of the wagon or group of wagons.

8. Braking installation according to claim 1, including a gyroscope adapted for supplying signals indicating the angular speeds of the wagon or group of wagons relative to three orthogonal axes.

9. Braking installation according to claim 1, wherein said processing and control means are configured to provide an anti-skid function.

* * * * *